(12) United States Patent
Van Boven et al.

(10) Patent No.: US 12,489,754 B2
(45) Date of Patent: Dec. 2, 2025

(54) USER PRIVACY IN EXTENDED REALITY

(71) Applicant: Nagravision Sàrl, Cheseaux (CH)

(72) Inventors: Christian Van Boven, Madrid (ES); Charles Stevens, Mountain View, CA (US)

(73) Assignee: Nagravision Sàrl, Cheseaux (CH)

( * ) Notice: Subject to any disclaimer, the term of this patent is extended or adjusted under 35 U.S.C. 154(b) by 203 days.

(21) Appl. No.: 18/358,172

(22) Filed: Jul. 25, 2023

(65) Prior Publication Data

US 2025/0039181 A1 Jan. 30, 2025

(51) Int. Cl.
 *H04L 9/40* (2022.01)
 *H04L 67/131* (2022.01)
(52) U.S. Cl.
 CPC .......... *H04L 63/101* (2013.01); *H04L 67/131* (2022.05)
(58) Field of Classification Search
 CPC ..... H04L 63/08; H04L 63/0884; H04L 63/10; H04L 63/101; H04L 63/102; H04L 67/131
 See application file for complete search history.

(56) References Cited

U.S. PATENT DOCUMENTS

| 8,424,065 | B2 * | 4/2013 | Betzler | G06F 21/41 |
| | | | | 726/28 |
| 2010/0005028 | A1 * | 1/2010 | Hartley | H04L 63/061 |
| | | | | 705/50 |
| 2022/0255995 | A1 * | 8/2022 | Berliner | H04W 4/80 |
| 2024/0031346 | A1 * | 1/2024 | Merdassa | H04L 63/08 |

* cited by examiner

*Primary Examiner* — Boris D Grijalva Lobos
(74) *Attorney, Agent, or Firm* — Maier & Maier, PLLC

(57) ABSTRACT

Anonymous access may be provided using an authorization gateway. Anonymous access reuses objects in different extended reality environments rather than having each object be restricted to a single environment. Anonymous access increases privacy when using different environments. The user and the extended reality server communicate via an authorization gateway, preventing the extended reality server from directly gathering user information. A token issuing authority may issue tokens in response to payment and forward the payment to an extended reality provider. The user pays the token issuing authority and receives a token that does not identify the user. The token issuing authority forwards the payment to the extended reality provider. The user provides the token to the authorization gateway, which communicates with the extended reality server to provide the extended reality environment to the user. Thus, the user's payment is verified by the authorization gateway without specifically identifying the user.

18 Claims, 8 Drawing Sheets

USER PRIVACY IN EXTENDED REALITY

FIELD

The embodiments discussed herein are related to anonymous user privacy and object reuse in extended reality environments.

BACKGROUND

Virtual reality environments are three-dimensional computer-generated simulations that can be interacted with in a seemingly real way by a person using special equipment such as a helmet with a screen inside, gloves fitted with sensors, hand-held devices that can be motion-tracked, or any suitable combination thereof. Thus, the user interacts with a "virtual" world.

Augmented reality environments make use of a real-world view with superimposed computer-generated images. The computer-generated images may include information about real-world objects, thus "augmenting" the real world. The user may be enabled to interact with the computer-generated portion of the display. This may be termed "mixed reality," as the user is enabled to interact both with real-world objects and with virtual objects. The term "extended reality" encompasses virtual reality, augmented reality, and mixed reality.

One form of extended reality is a metaverse. A metaverse is a massively scaled and interoperable network of real-time rendered three-dimensional virtual worlds that can be experienced synchronously and persistently by an effectively unlimited number of users. Each user may have an avatar in the metaverse with a definite location, appearance, identity, and history.

BRIEF DESCRIPTION OF THE DRAWINGS

Example embodiments will be described and explained with additional specificity and detail through the use of the accompanying drawings.

DETAILED DESCRIPTION OF THE DRAWINGS

Figure 1:
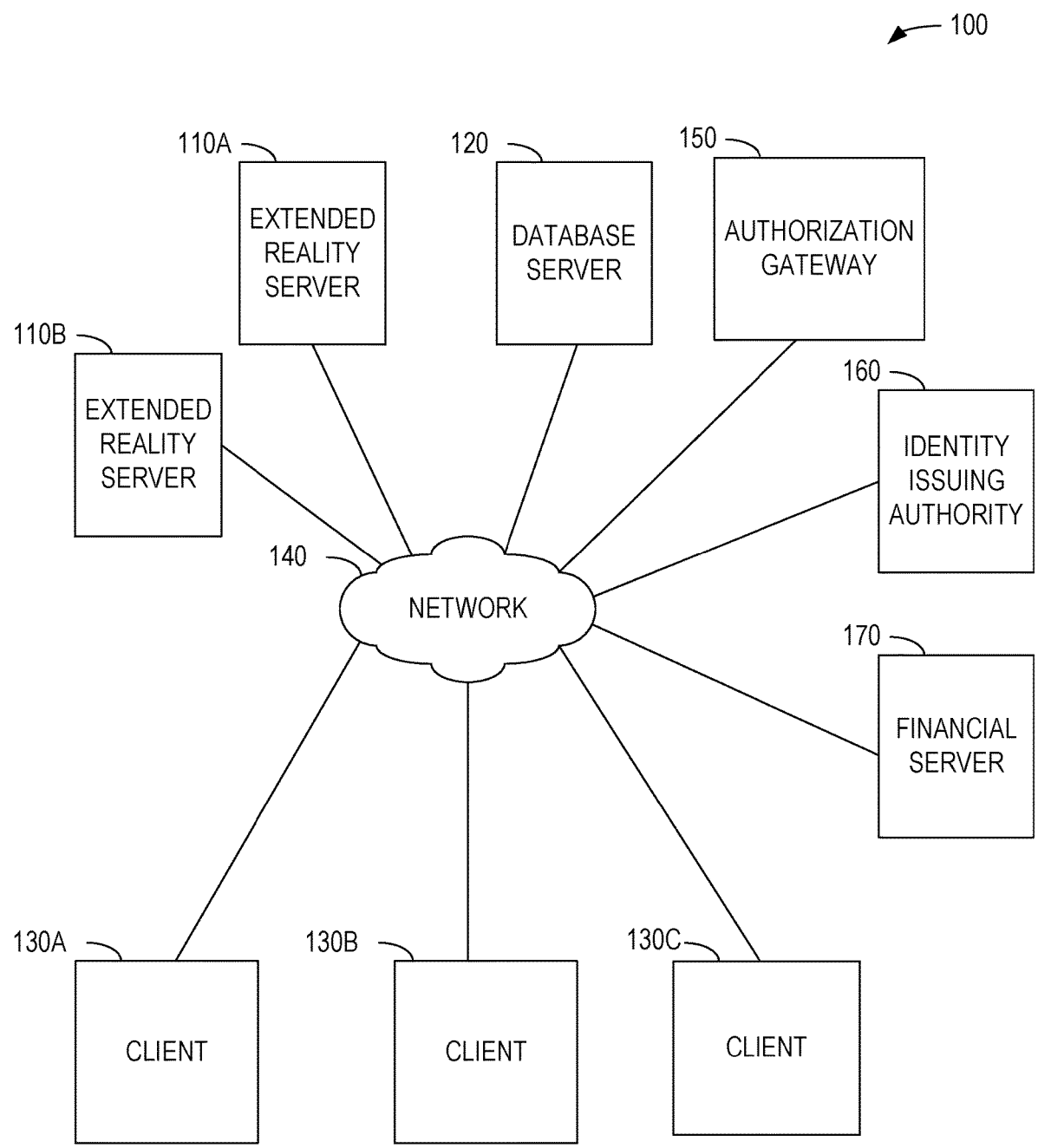
FIG. 1 is a network diagram illustrating a network environment suitable for implementing user privacy in extended reality, according to some example embodiments.

Aspects of the disclosure provide systems and methods for anonymous user privacy in extended reality. Anonymous access to extended reality (e.g., virtual worlds) and assets within the extended reality environment may be provided using an authorization gateway. The user and the extended reality server communicate via the authorization gateway, preventing the extended reality server from directly gathering information about the user.

The extended reality server may trust the authorization gateway to determine that the user is entitled to access the extended reality server. The user's identity may further be protected from the authorization gateway by using tokens rather than identifying information such as a name, password, and other locale data.

A token issuing authority may issue tokens in response to payment and forward the payment to an extended reality provider. For example, a one-day pass for a particular extended reality environment may have a fixed fee associated with it. The user pays the token issuing authority and receives a token that does not identify the user. The token issuing authority forwards the payment (or a portion thereof) to the extended reality provider. The user provides the token to the authorization gateway, which communicates with the extended reality server to provide the extended reality environment to the user.

The same technique may be used to control access to assets within extended reality. As used herein, an asset refers to any virtual item or area. For example, an asset may be an item of clothing for a user's avatar, a dance move for the user's avatar, a song for streaming, or an area in virtual reality with restricted access. In general, assets are licensed rather than sold. For convenience, as used herein, purchasing an asset refers to purchasing a license to access the asset. Thus, buying an outfit for an avatar is shorthand for buying a license for using the outfit on the avatar. In some example embodiments, the license is exclusive and only the single licensed user is enabled to use the licensed item.

To illustrate, a user may wish to have their avatar wear a licensed item of clothing. The item of clothing, or its equivalence, may exist in multiple extended reality environments. After purchasing access to the item of clothing in one extended reality environment, a token corresponding to the access may be issued to the user. The same token may be provided to the authorization gateway, allowing the authorization gateway to confirm that access has been purchased. When the user attempts to access a corresponding asset in another extended reality environment, a server of the other extended reality environment asks the authorization gateway whether the user has already purchased access. Based on the receipt of the token, the authorization gateway responds in the affirmative and the other extended reality server permits the user to access the asset.

By use of the systems and methods described herein, users are provided greater control over their experience in extended reality environments, protecting their privacy. Technological systems for extended reality are improved, as the resulting system is more useful to the user than were prior-art systems. Furthermore, users are enabled, with respect to assets purchased or otherwise gained access to in one environment, to access those assets in other environments.

FIG. 1 is a network diagram illustrating a network environment suitable for implementing user privacy in extended reality, according to some example embodiments. The network environment 100 includes extended reality servers 110A and 110B, a database server 120, an authorization gateway 150, an identity issuing authority 160, a financial server 170, client devices 130A, 130B, and 130C, and a network 140. The extended reality servers 110A-110B may be referred to generically as an extended reality server 110.

The extended reality servers 110A-110B send data to the client devices 130A-130C (e.g., computers, smart phone, virtual reality headsets, or any suitable combination thereof) to allow users of the client devices 130A-130C to experience extended reality. For example, data may be provided to the client devices 130A-130C that allows the client devices 130A-130C to render a virtual reality environment. The extended reality servers 110A and 110B may also determine which data to provide to each of the client devices 130A-130C based on information received from that client device. For example, the client device 130A may provide a location of an avatar of a user within the extended reality environment, and the extended reality server 110A may provide data regarding objects that can be viewed from the location of the avatar without providing data regarding other objects, thus reducing the consumption of network bandwidth.

The data received from one of the client devices 130A-130C may affect the data provided by the extended reality server 110A or 110B to another one of the client devices 130A-130C. For example, the location and orientation of a user's avatar may be received from the client device 130A and, based on the received location and orientation, data to render the user's avatar is provided to the client device 130B. Thus, users in the extended reality environment are enabled to see each other's avatars.

The database server 120 may store data used by the extended reality servers 110A and 110B. For example, data for the entire extended reality environment (e.g., a full-size model of the Earth) may be stored in the database server 120 while a smaller portion of the extended reality environment (e.g., only portions of the model in which one or more user avatars are currently present) is stored in memory of the extended reality server 110A.

The client devices 130A-130C receive data from the extended reality servers 110A-110B and present the extended reality environment to a user on a display device (e.g., a head-mounted display). The client devices 130A-130C also provide data regarding the user or the user's avatar to the extended reality servers 110A and 110B. For example, motion data, location data, orientation data, or any suitable combination thereof may be provided.

The authorization gateway 150 acts as an intermediary between the extended reality servers 110A-110B and the client devices 130A-130C. This allows users to access extended reality without providing personal identifying information (PII) to the extended reality servers 110A-110B. In a traditional system, when a user of the client device 130A attempts to connect to the extended reality server 110A, the extended reality server 110A confirms the identity of the user (e.g., by a username and password, two-factor authentication, or the like). Instead, the authorization gateway 150 may confirm the identity of the user and inform the extended reality server 110A that the user is authorized without providing the PII to the extended reality server 110A.

Assets of the extended reality environment may be protected separately from access to the extended reality server 110. For example, a user may be permitted to enter the extended reality environment using a free account, but only permitted to access certain areas with a paid account. As another example, a user may be permitted to change the outfit of their avatar only to individually authorized outfits.

As a third example, a user may be permitted to select a particular movement (e.g., a dance) for their avatar only if they have a license for the movement. When a request to perform the movement is received from a client device 130, the extended reality server 110A or 110B sends a request to the authorization gateway 150 that identifies the user and the requested movement or other asset. In response, the authorization gateway 150 indicates whether the asset is licensed for the user. If the asset is licensed, the extended reality server 110A or 110B allows the user to access the requested asset or perform the requested movement. Otherwise, the request is denied.

As another example, a user may be permitted to stream audio only if licensed. When the user's avatar enters an area in which a DRM-protected audio segment is being played, the extended reality server 110A or 110B sends a request to the authorization gateway 150 that identifies the user and the requested audio. In response, the authorization gateway 150 indicates whether the audio is licensed for the user. If the audio is licensed, the extended reality server 110A or 110B streams the audio to the user's device. Otherwise, the audio is not provided. Thus, a concert, album release, or speech may be made accessible only to licensed users, even if access of the avatar to the location of the event is not restricted.

The license information for assets may be maintained by the database server 120 for access by the authorization gateway 150. When a user purchases access to an asset, the authorization gateway 150 may provide information about the purchase (e.g., an identifier of the user, an identifier of the asset, an identifier of the seller, or any suitable combination thereof).

To maintain anonymity of the user with respect to the authorization gateway 150, the identity issuing authority 160 may be used. The identity issuing authority 160 verifies the identity of the user and provides a cryptographically secure token to the client device 130 of the user (e.g., by generating and signing the token using a private key). The user provides the token to the authorization gateway 150. The authorization gateway 150 verifies the signature of the token to ensure validity, verifying that the user is a valid user without determining which particular valid user is accessing the system.

When the user purchases access to an asset from an extended reality server 110, the extended reality server 110 sends a request for payment to the identity issuing authority 160 along with an identifier of the user (e.g., the anonymized token used by the user to access the extended reality server 110). Since the identity issuing authority 160 is the entity that can identify the user, the identity issuing authority 160 is able to request a transfer of funds, by the financial server 170, from an account of the user to an account of the extended reality provider. The identity issuing authority 160 generates a token that associates the purchased asset with the user. Thereafter, the user may provide the token to verify access to the asset without revealing the user's identity.

The extended reality servers 110A-110B, the database server 120, the authorization gateway 150, the identity issuing authority 160, the financial server 170, and the client devices 130A-130C may each be implemented in a computer system, in whole or in part, as described below with respect to FIG. 8.

Any of the machines or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. Any or all of the devices 110A-130C may include a database or be in communication with a database server that provides access to a database. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The extended reality servers 110A-110B, the database server 120, the authorization gateway 150, the identity issuing authority 160, the financial server 170, and the client devices 130A-130C may be connected by the network 140. The network 140 may be any network that enables communication between or among machines, databases, and devices. Accordingly, the network 140 may be a wired network, a wireless network (e.g., a mobile or cellular network), or any suitable combination thereof. The network 140 may include one or more portions that constitute a private network, a public network (e.g., the Internet), or any suitable combination thereof.

Though two extended reality servers 110A-110B and three client devices 130A-130C are shown in FIG. 1, more devices are contemplated. Thus, a client device may be in communication with any number of extended reality servers and an extended reality server may be in communication with any number of client devices, allowing for a global network of users in multiple extended reality environments. Accordingly, the systems and methods described herein enable a platform by which extended reality providers and consumers can interface.

Figure 2:
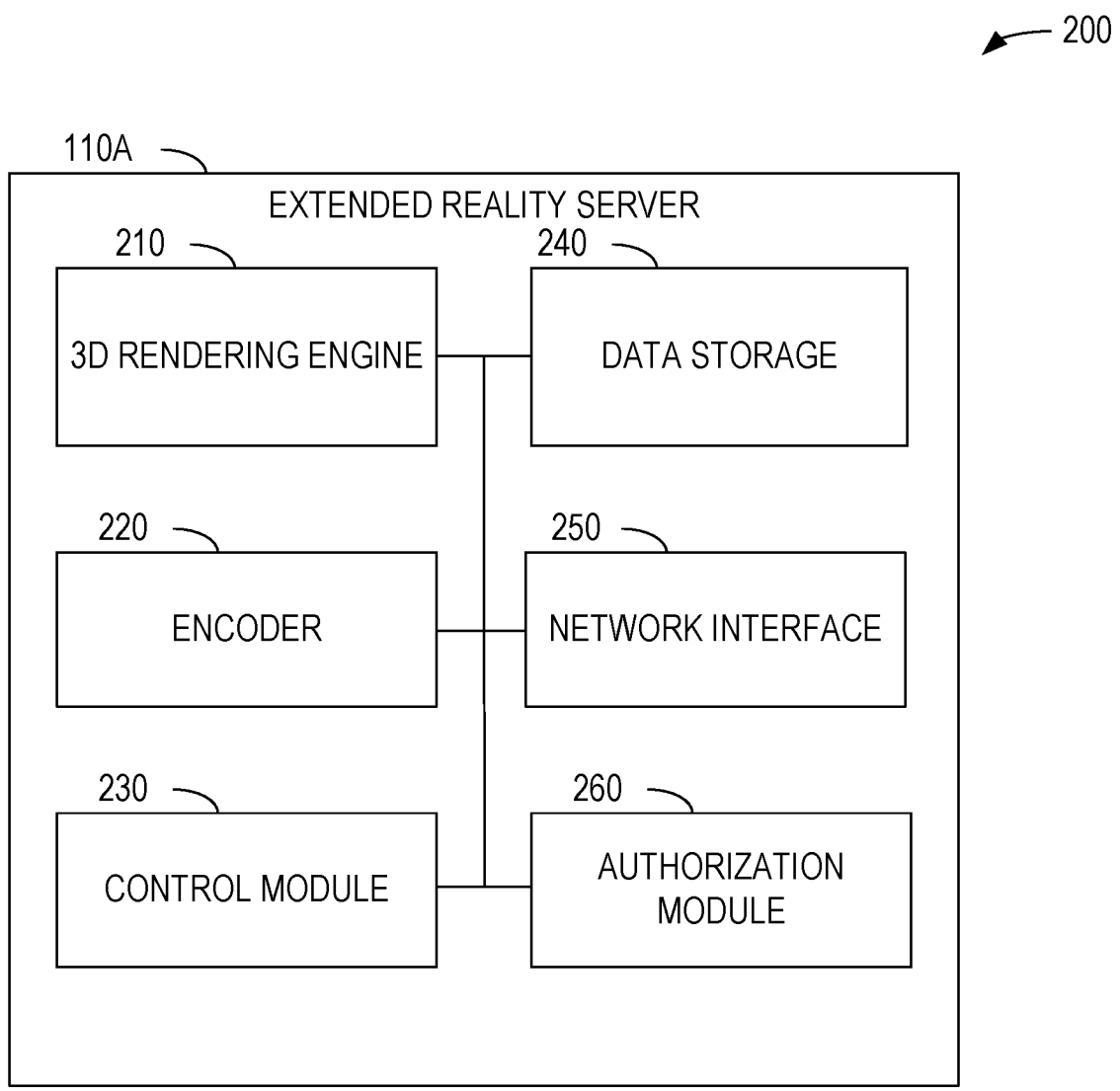
FIG. 2 is a block diagram of an extended reality server, according to some example embodiments, suitable for implementing user privacy in extended reality.

FIG. 2 is a block diagram 200 of the extended reality server 110A, according to some example embodiments, suitable for implementing user privacy in extended reality. The extended reality server 110A is shown as including a three-dimensional (3D) rendering engine 210, an encoder 220, a control module 230, data storage 240, and a network interface 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The network interface 250 receives data sent to the extended reality server 110A and transmits data from the extended reality server 110A. For example, the network interface 250 may receive, from the encoder 220, extended reality data for display on a display device of one of the client devices 130A-130C. Communications sent and received by the network interface 250 may be intermediated by the network 140.

The control module 230 controls the extended reality environment. For example, a day/night cycle may be implemented that changes the ambient lighting level of the 3D environment rendered by the 3D rendering engine 210. As another example, non-player characters (NPC) in an extended reality game may move or perform actions in the extended reality environment. Based on data accessed from the data storage 240 and commands received from the control module 230, the 3D rendering engine 210 generates a description of a 3D environment. The description of the 3D environment is provided to the encoder 220, which converts the description into a network-friendly format (e.g., H.264 format, Graphics Language Transmission Format (GLTF) format, or any suitable combination thereof) and transmits the encoded data over the network 140 to the client devices 130A-130C.

Different client devices 130 may receive different data based on subscription level. For example, the client device 130A may be associated with a user account receiving a free or basic level service, and based on the level of service, low-resolution data may be provided to the client device 130A. As another example, the client device 130B may be associated with a user account subscribed to a premium level of service and, based on the level of service, high-resolution data may be provided to the client device 130B. Similarly, premium content may not be provided to a non-premium subscriber. For example, a basic subscriber may not have permission to view a virtual concert. Accordingly, the basic subscriber would see an empty stage at the virtual concert venue. By contrast, the premium subscriber would receive the data objects that are rendered for display as the band members, musical gear, and so on.

Verification of user access rights may be performed by confirming the identity of the user (e.g., by receiving a username and password from the client device 130A) and checking the rights associated with the user in the data storage 240. Alternatively, verification of user access rights may be performed by requesting a token associated with the particular access right from the user's client device 130 or the authorization gateway 150.

The extended reality server 110A may store scene data (i.e., data for the extended reality environment that is separate from user avatar data), avatar data, user preferences, digital rights management (DRM) keys, or any suitable combination thereof in the data storage 240.

Figure 3:
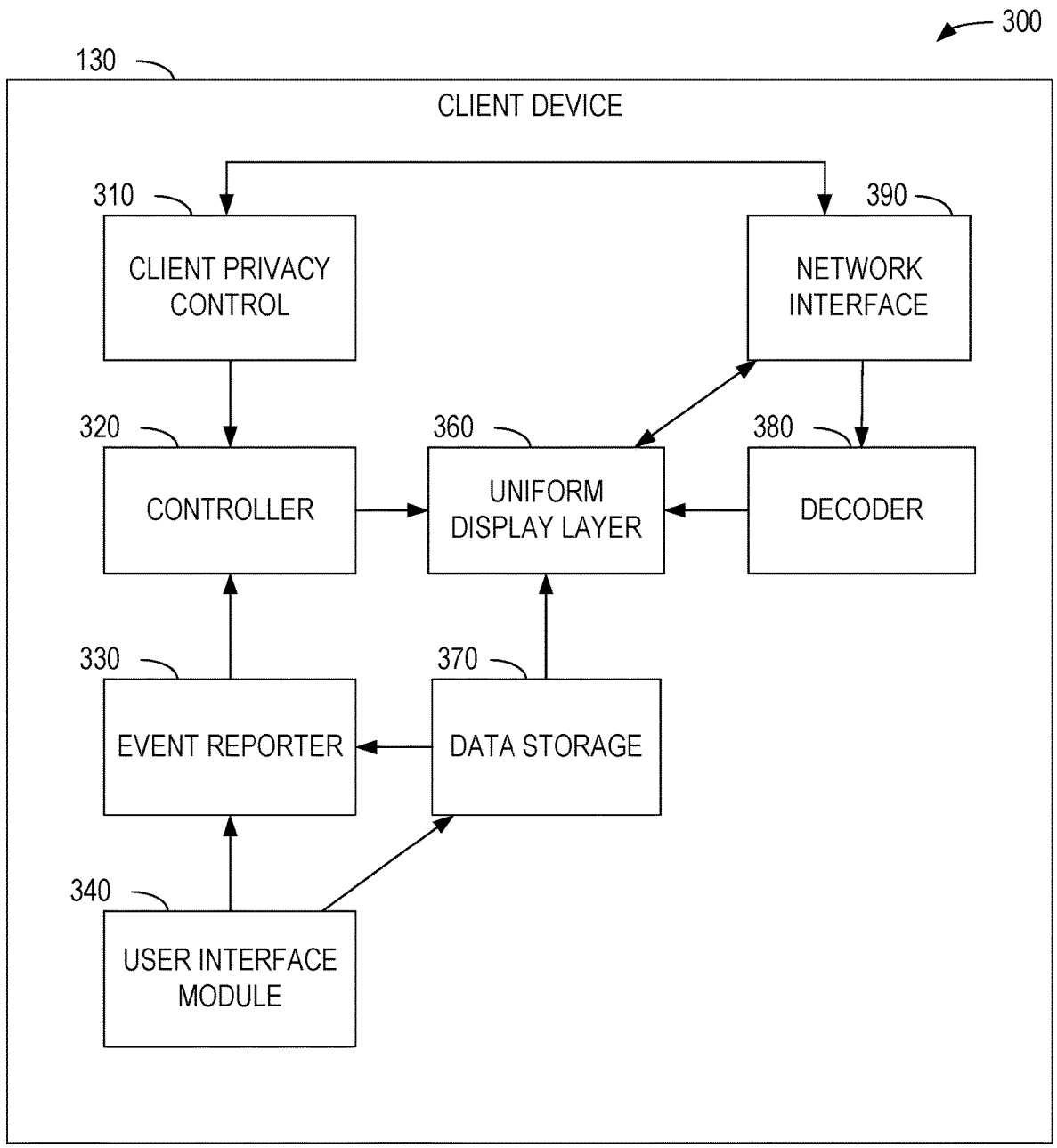
FIG. 3 is a block diagram of a client device, according to some example embodiments, suitable for implementing user privacy in extended reality.

FIG. 3 is a block diagram 300 of a client device 130, according to some example embodiments, suitable for implementing user privacy in extended reality. The client device 130 includes a client privacy control module 310, a controller 320, an event reporter 330, a user interface module 340, a uniform display layer 360, a data storage 370, a decoder 380, and a network interface 390. The client device 130 can also include a 3D rendering engine, e.g., if it receives data about objects encoded in GLTF. Note that it is possible for some 3D rendering to be performed on the extended reality server 110A or 110B and another part on the client device 130.

The network interface 390 enables the client device 130 to connect to the network 140. Via the network 140, the client device 130 communicates with the extended reality servers 110A-110B, the authorization gateway 150, the identity issuing authority 160, or any suitable combination thereof.

The user interface module 340 enables a user to set configuration options such as privacy restrictions, rating controls, invisibility within the extended reality environment, or any suitable combination thereof. The configuration options are stored in data storage 370. The user interface module 340 may also receive inputs to control the user's avatar in the extended reality environment. User inputs may be received by keyboard, game controller, headset, motion controllers (e.g., accelerometers), detection of user movement (e.g., via cameras watching the user), or any suitable combination thereof.

The event reporter 330 collates information for the extended reality server 110A and, together with the controller 320, manages status and event information that is returned to the extended reality server 110A. Example events include interactions of the user's avatar with the environment (e.g., a change in the avatar's location or orientation in the extended reality environment), interactions of the user's avatar with avatars of other users, status changes of the user or the user's avatar (e.g., a change in visibility/invisibility status of the user's avatar or a change in pose of the user's avatar).

The client privacy control module 310 determines, based on the user configuration options, which extended reality servers 110 have access to information regarding the user or the user's avatar. For example, if the user configuration options provide that the user's identity should not be provided to any of the extended reality servers 110, communication with all of the extended reality servers 110 will be intermediated by the authorization gateway 150.

The decoder 380 receives data from the extended reality server 110A via the network interface 390. The received data may be encrypted or otherwise encoded. The decoder 380 decodes at least some of the data and provides the decoded data to the uniform display layer 360.

The 3D rendering engine on the client receives data from the extended reality server 110A via the network interface 390. The received data may be encrypted or encoded, e.g. based on GLTF standard. The 3D rendering engine will render at least some of the data and provides the decoded data to the uniform display layer 360.

Figure 4:
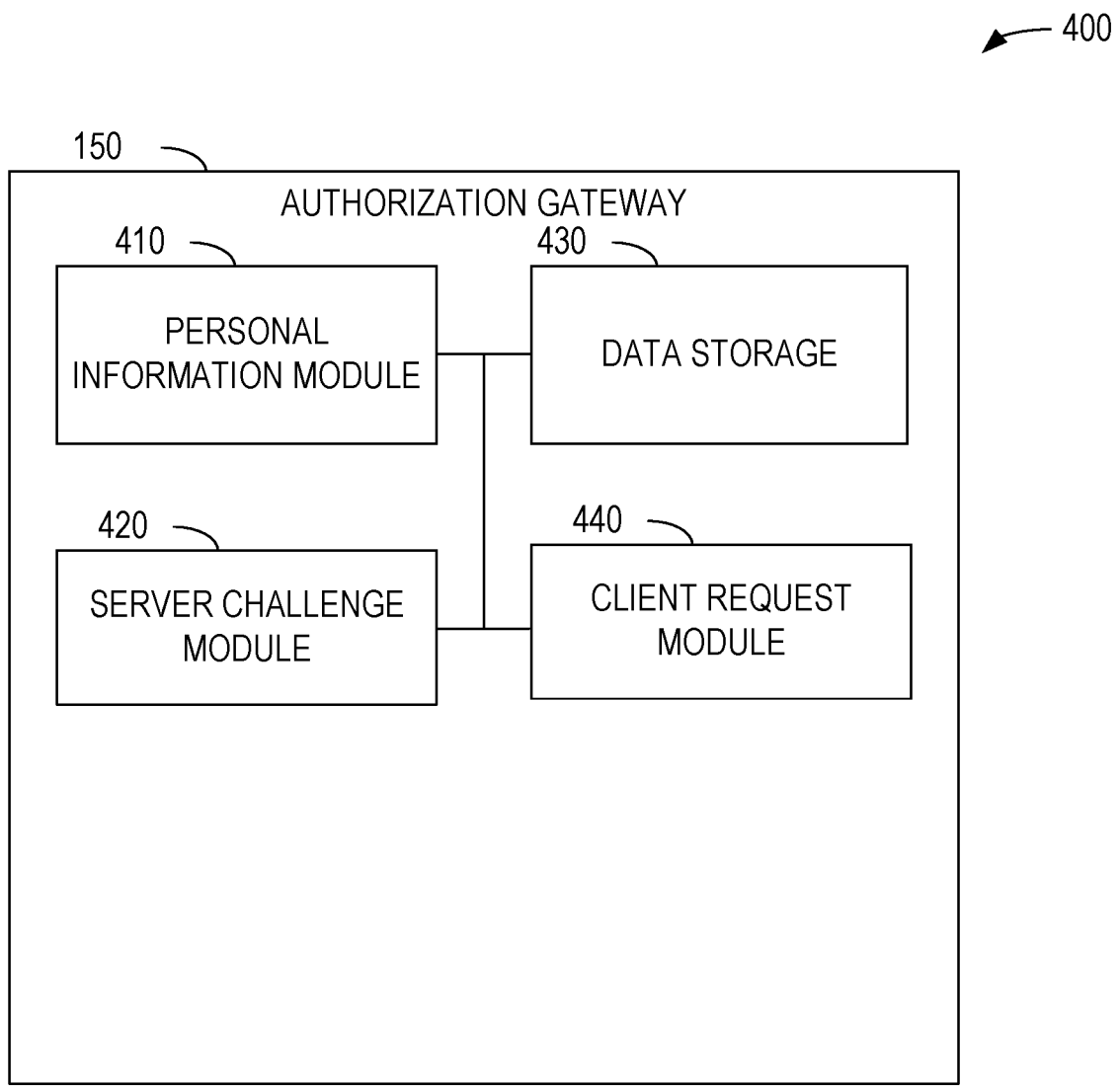
FIG. 4 is a block diagram of an authorization gateway, according to some example embodiments, suitable for implementing user privacy in extended reality.

FIG. 4 is a block diagram 400 of the authorization gateway 150, according to some example embodiments, suitable for implementing user privacy in extended reality. The authorization gateway 150 comprises a personal information module 410, a server challenge module 420, a data storage module 430, and a client request module 440.

The authorization gateway 150 is trusted by users to maintain the privacy of the personal information and is trusted by the extended reality servers 110 to provide valid information about the access rights of the users. The personal information module 410 manages the personal information (e.g., name, username, phone number, address, credit card number, and the like) of users.

The server challenge module 420 receives challenges from the extended reality servers 110 when users attempt to access rights-managed content. For example, an anonymized user may be traversing a virtual world provided by the extended reality server 110A and request access to a particular outfit for their avatar. The extended reality server 110A "challenges" the user's request to verify the user by sending a communication to the authorization gateway 150. The communication identifies the user and the asset being accessed. In response, the server challenge module 420 determines if the identified user has access rights to the asset and informs the extended reality server 110A. Thus, the extended reality server 110A is enabled to provide or deny access based on the information provided by the authorization gateway 150. Likewise, the user is enabled to obtain access without providing personal information to the extended reality server 110A.

The data storage module 430 may store data regarding users, extended reality service providers, virtual items, user access rights, user configuration data, or any suitable combination thereof. The data storage module 430 may access the stored data from a local storage device (e.g., a hard drive, flash memory, or the like) or from a remote storage device (e.g., network attached storage, a database server, or the like).

In addition to or instead of receiving challenges from servers when users request access, from the servers, to content, the authorization gateway 150 may send client requests to the servers. For example, a user may request to be connected with the extended reality server 110A. The user may confirm their identity (e.g., by providing a username and password) to the client request module 440. After verifying the user's identity (e.g., by comparing the provided information with stored personal information), the client request module 440 generates an anonymous connection request to the extended reality server 110A. Because of the trust relationship between the extended reality server 110A and the authorization gateway 150, the extended reality server 110A allows the anonymous connection. Either by continued intermediation or by connecting the client device 130A to the extended reality server 110A, the user is enabled to continue the authorized session.

Figure 5:
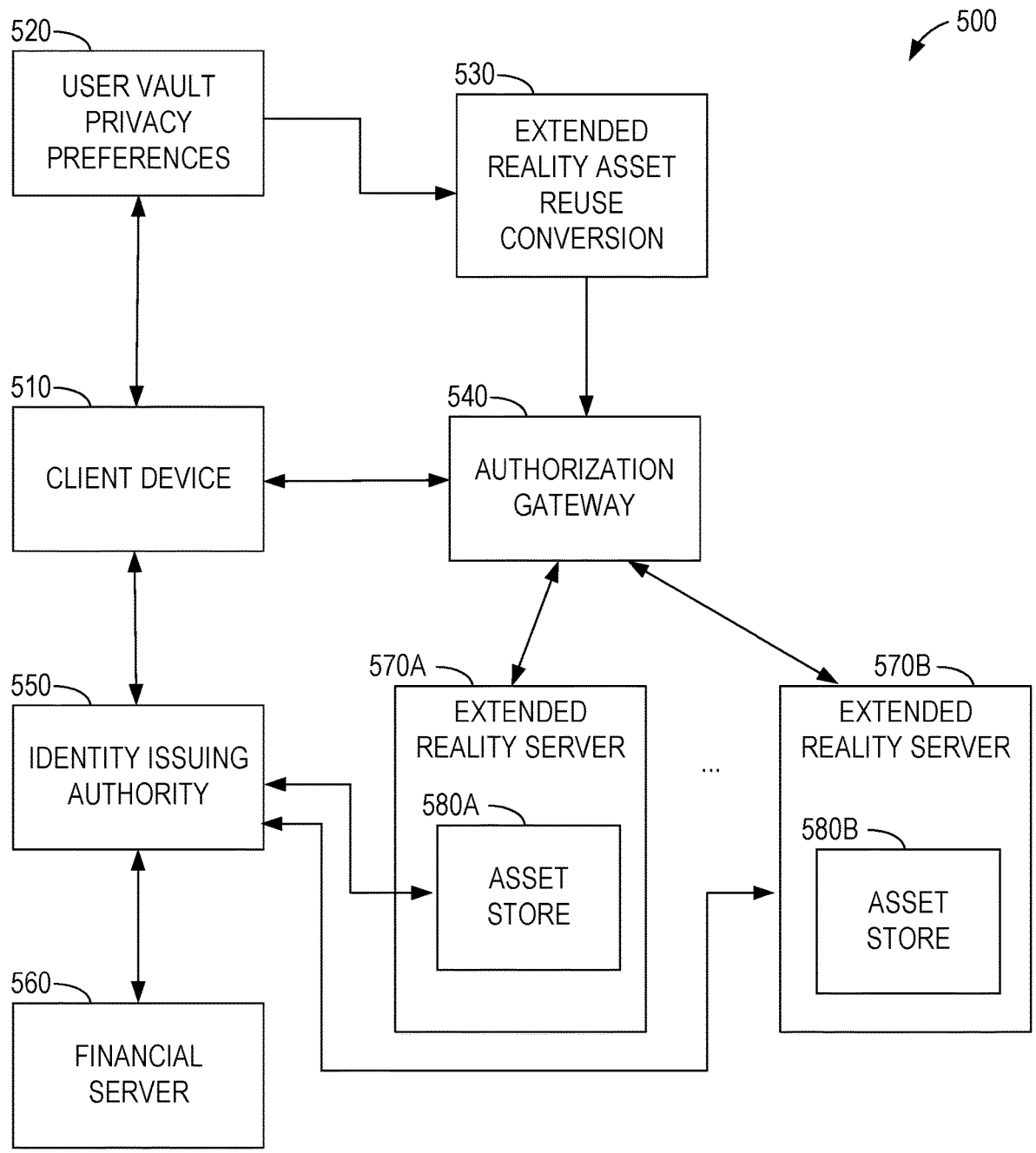
FIG. 5 is a block diagram of relationships between devices, according to some example embodiments, suitable for implementing user privacy in extended reality.

FIG. 5 is a block diagram 500 of relationships between devices, according to some example embodiments, suitable for implementing user privacy in extended reality. The block diagram 500 includes a client device 510, user vault privacy preferences 520, an extended reality asset reuse conversion module 530, an authorization gateway 540, an identity issuing authority 550, a financial server 560, extended reality servers 570A and 570B, and asset stores 580A and 580B. Though only one client device 510 and one financial server 560 are shown, support for any number of client devices and financial institutions is contemplated. Similarly, though only two extended reality servers 570A-570B and asset stores 580A-580B are shown, support for any number of extended reality servers and asset stores is contemplated. In some example embodiments, the authorization gateway 540 also provides the functions described as being performed by the identity issuing authority 550.

The client device 510 provides privacy preferences to the user vault privacy preferences 520. Example privacy preferences include selectively allowing or disallowing each of the extended reality servers 570A-570B to access the user's name or username. A user vault is a data store of information relevant to the user. For example, the user vault may also store information regarding the ownership of digital assets by the user, and such information may be selectively shared with the extended reality servers 570A-570B, the authorization gateway 540, or both. The user may own many digital assets but choose to inform the authorization gateway 540 or one of the extended reality servers 570A-570B only at the time of attempting to access a particular digital asset.

A user may anonymously purchase access to a digital asset from one of the asset stores 580A-580B. The user accesses, for example, the extended reality server 570A via the authorization gateway 540. The user selects an asset to purchase from the asset store 580A. In response, the extended reality server 570A sends a request for payment to the identity issuing authority 550, providing an identifier of the user with the extended reality server 570A.

For example, the authorization gateway 540 may provide a unique token to the extended reality server 570A. The unique token distinguishes the user from all other users currently accessing the server without providing personally identifying information. The extended reality server 570A includes the token and the amount requested to the identity issuing authority 550. Based on the token, the identity issuing authority 550 determines the identity of the user and requests confirmation or payment information from the client device 510. After receiving or looking up the user's payment information (e.g., checking account number, credit card number, financial institution name, and the like), the identity issuing authority 550 communicates with the financial server 560 to request a transfer of funds from the user's account to an account of the extended reality environment provider. The request may include an identifier of the user (e.g., the user's payment information) and an identifier of the recipient of the payment.

After the transaction is complete, the user vault is updated to show the user's ownership of the asset. In a later session, if the user attempts to use the asset, the extended reality server 570A sends a challenge to the authorization gateway 540 (e.g., including the token for the session and an identifier of the asset). In response, the authorization gateway 540 determines the user's identity and requests, from the user vault, if the user has access to asset. In this case, the answer is yes, so the authorization gateway 540 confirms to the extended reality server 570A that the user already owns the asset and the extended reality server 570A allows the user to access the asset purchased from the asset store 580A.

If the user attempts to use a corresponding asset in a different extended reality environment, such as that provided by the extended reality server 570B, the same process is followed. In this case, the authorization gateway 540 will respond that the user is permitted to access the asset even though the asset was not purchased from the asset store 580B but rather from the asset store 580A of a different metaverse. The extended reality asset reuse conversion module 530 performs any needed modifications to enable the asset from the asset store 580A to work in the environment of the extended reality server 570B.

The authorization gateway 540 may conditionally provide user information to the extended reality servers 570A-570B based on the user vault privacy preferences 520. For example, the user may allow or disallow each of the extended reality servers 570A-570B to access a global username of the user or extended reality environment-specific usernames of the user. Thus, the authorization gateway 540 may receive, from the extended reality server 570A, a request for a global identifier of the user or a request for an identifier of the user on the extended reality server 570B. Based on a stored preference of the user, the authorization gateway 540 allows or denies the request for the identifier of the user.

As another example of user privacy protection, the authorization gateway 540 may receive, from the extended reality server 570B, a request for financial account information of the user. Based on a stored preference of the user, the authorization gateway 540 grants or denies the request for the financial account information.

Anonymous, pseudonymous, or identifiable access to the extended reality servers 570A-570B may be provided by the authorization gateway 540. With identifiable access, the extended reality servers 570A-570B can access the personally identifying information of the user. With pseudonymous access, the extended reality servers 570A-570B cannot access the personally identifying information of the user, but are given a token that can be used by the authorization gateway 540 or the identity issuing authority 550 to access the user's personally identifying information. With anonymous access, the extended reality servers 570A-570B are not provided with the token that can be used to access the user's personally identifying information.

Anonymous or pseudonymous access may be partitioned based on session, extended reality environment, both, or neither. The determination of how to partition the user's identifier may be controlled by a user preference. Session partitioning involves an identifier for the user that is generated for each session. Thus, there is no cross-session identity for the user. Extended reality environment partitioning refers to using an identifier for the user that is retained across sessions, but not across extended reality servers. Thus, the user activity on one extended reality environment is not traceable to the user's distinct identifier on another extended reality environment. Unpartitioned access uses a single common identifier across multiple extended reality environments and sessions. Thus, all user activity on all extended reality environments can be correlated, even though the user's personal identifying information is not known.

A user of the client device 510 connects to the authorization gateway 540. The user is authenticated (e.g., using two-factor authentication, a username and password, or the like). The authorization gateway 540 determines a different identifier to use for communication with the extended reality servers 570A-570B. For example, the user may have a different username and password for each of the extended reality servers 570A-570B. As another example, the authorization gateway 540 may create a new identifier for the user for each session. As still another example, the extended reality server 570A or 570B may generate the anonymous identifier for the session. Thus, over a series of sessions by a user on different extended reality servers 570A-570B, the authorization gateway 540 has access to the information that the sessions all involve the same user, but the extended reality servers 570A-570B do not.

The client device 510 may request an identity from the identity issuing authority 550. The identity issuing authority 550 may receive personally identifying information about the user from the client device 510 such as name, email address, financial account information (e.g., bank name, credit card number, checking account number, or any suitable combination thereof). In response, the identity issuing authority 550 provides a token to the client device 510. Thereafter, the token may be used by the identity issuing authority 550 to look up the personally identifying information about the user. Meanwhile, other devices (e.g., the extended reality server 570A) do not have access to the personally identifying information, even if they have the token.

The client device 510 may provide the token to the extended reality server 570A (either directly or via the authorization gateway 540). Based on the token, the extended reality server 570A can determine what access rights are available to the user. For example, the user may have no access rights. In response, the extended reality server 570A can offer a subscription to access the extended reality environment provided by the extended reality server 570A. If the user accepts the offer, the extended reality server 570A sends a request for payment, along with the token, to the identity issuing authority 550. The identity issuing authority 550 looks up the personally identifying information of the user based on the token. Using contact information included in the personally identifying information (e.g., an email address or phone number), the identity issuing authority 550 may send a verification request to the client device 510 or another device of the user to confirm that payment is authorized. The identity issuing authority 550 uses the financial information of the user to communicate with the financial server 560 to transfer the funds from the user's account to an account for the extended reality server 570A.

After the transaction is complete, the extended reality server 570A associates the purchased access rights with the token belonging to the user (e.g., in a database). As a result, the user now has access to the extended reality server 570A without revealing personally identifying information to the extended reality server 570A. In future sessions, the user can provide the same token to allow the extended reality server 570A to verify the access rights purchased.

As a more specific example, the authorization gateway 540 may receive a first request from the user of the client device 510 to access the extended reality server 570A, the first request comprising an identifier of the user. The authorization gateway 540 identifies, based on the identifier included in the first request, another identifier for the user (e.g., an identifier used previously by the user on the extended reality server 570A or a newly generated identifier). The authorization gateway 540 sends, on behalf of the user, an access request to the extended reality server 570A, the access request comprising the other identifier.

Figure 6:
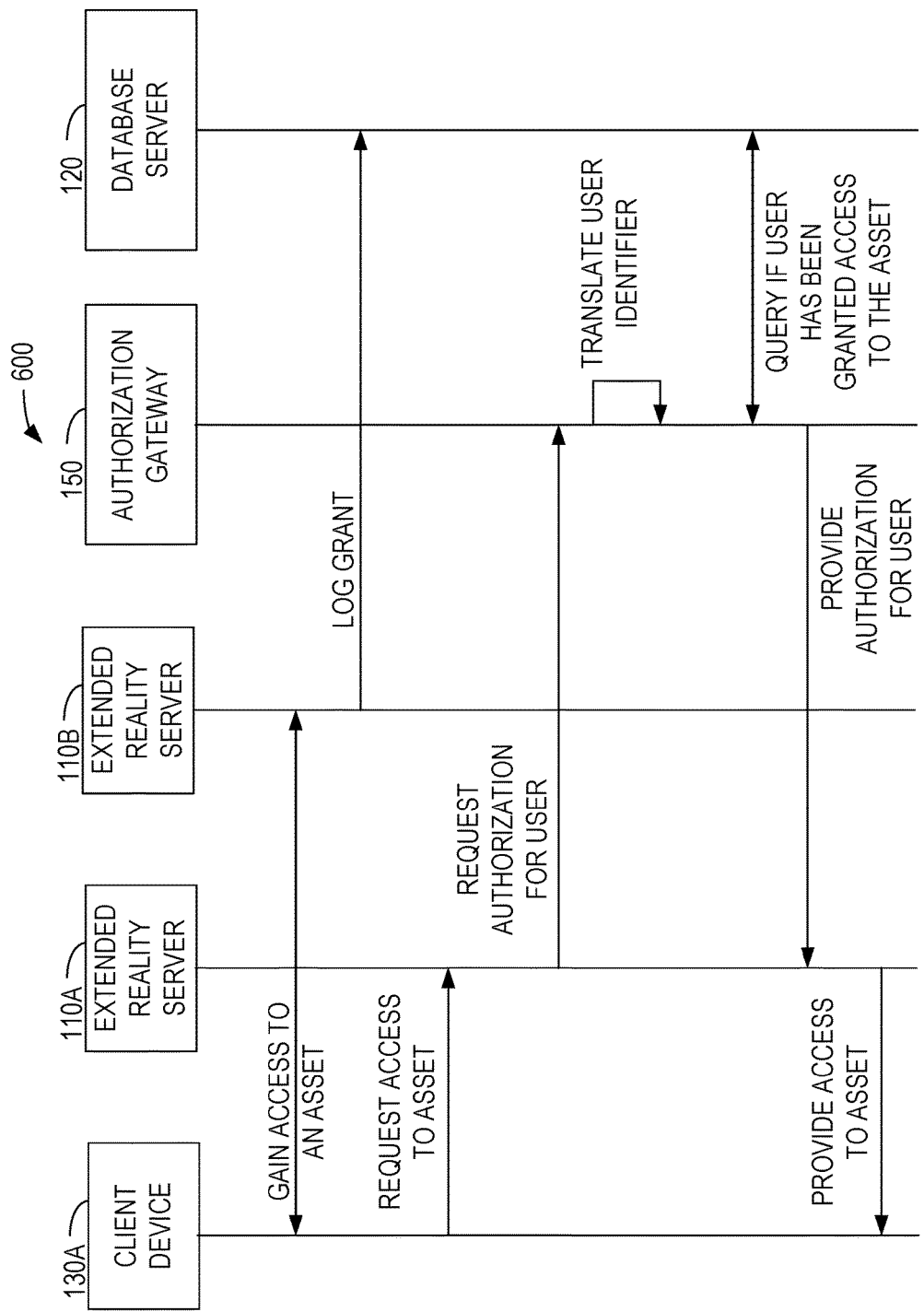
FIG. 6 is a swimlane diagram showing communications among a client device, two extended reality servers, an authorization gateway, and a database server, suitable for implementing user privacy in extended reality according to some example embodiments.

FIG. 6 is a swimlane diagram 600 showing communications among the client device 130A, two extended reality servers 110A and 110B, the authorization gateway 150, and the database server 120, all of FIG. 1, suitable for implementing user privacy in extended reality according to some example embodiments.

The client device 130A gains access to an asset from the extended reality server 110B (e.g., by purchasing the access via an asset store as shown in FIG. 5). The purchase process may include the extended reality server 110B providing information about a number of available assets to the client device 130A, the user of the client device 130A selecting the asset via a user interface, the extended reality server 110B receiving payment for the asset from the user, or any suitable combination thereof. In some example embodiments, the user of the client device 130A may be granted access to the asset without charge. For example, access may be granted as part of a promotional program.

After the grant of the access or as part of the granting of access (e.g., as part of a purchase transaction), the extended reality server 110B logs the grant of the access with the database server 120. For example, a record may be added to a database hosted by the database server 120, the record comprising an identifier of the extended reality service provided by the extended reality server 110B, an identifier of the extended reality server 110B, an identifier of the user, an identifier of the client device 130A, an identifier of the asset, an expiration time for the user's use of the asset, or any suitable combination thereof. The logged user identifier may be an identifier of the user on the extended reality server 110B rather than a global identifier.

The logging of the grant of access may be performed using the authorization gateway 150 as an intermediary. For example, the user may be accessing the extended reality server 110B anonymously, such that the extended reality server 110B has a token issued by the authorization gateway 150 but does not have personally identifying information of the user. The extended reality server 110B provides the token along with the other data to be logged and the authorization gateway 150 determines the user information to be stored in the log. After combining the other information to be logged with the user information, the authorization gateway 150 sends the log information to the database server 120.

As another alternative, the extended reality server 110B may provide a digital proof of ownership to the client device 130A. The client device 130A provides the digital proof of ownership and a user identifier to the identity issuing authority 160, which signs a token that shows that the user owns the purchased asset. The signed token is stored in the user vault. Thereafter, the authorization gateway 150 can access the signed token to validate the user's access rights. The extended reality servers 110A-110B do not have access to the user's vault or the token that links the user to the purchased item, allowing for anonymous asset ownership.

After being granted access to the asset, the user may request access to the asset on a different extended reality service provided by the extended reality server 110A. To determine if the user should be granted access to the asset, the extended reality server 110A requests authorization for the user to use the asset. The request includes an identifier of the user, which may be an identifier of the user on the extended reality server 110B or a token provided by the authorization gateway 150. The token provided by the authorization gateway 150 to the extended reality server 110A is different from the token provided by the authorization gateway 150 to the extended reality server 110B, even for the same user and access time. Thus, the request for authorization cannot be sent directly from the extended reality server 110A to the database server 120, as the identifier of the user provided by the extended reality server 110A will not match the identifier stored when the grant of access from the extended reality server 110B was logged.

The authorization gateway 150 translates the user identifier received in the authorization request to the user identifier stored in the grant log. For example, the authorization gateway may use a unique identifier for each user that differs from the identifiers used by the extended reality servers 110A-110B. The authorization gateway 150 queries the database server 120 to determine if the user has been granted access to the asset from any supported asset store. In this example, the answer is yes, so the authorization gateway 150 provides authorization to the extended reality server 110A for the user to access the asset. If the database server 120 had responded that no record could be found of the user having granted access to the asset, the authorization gateway 150 would have sent a message to the extended reality server 110A to reject the user's request to access the asset.

The access to the asset may have been for a limited period of time. After the expiration of the period of time, the database server 120 may delete the record that indicates that the user has been granted access. As a result, when the authorization gateway 150 queries if the user has been granted access to the asset, the database server 120 will respond in the negative. Alternatively, the database server 120 may store an expiration time of the grant of access. When the authorization gateway 150 queries if the user has been granted access to the asset, the database server 120 provides a response that includes the expiration time. If the expiration time has already passed, the authorization gateway 150 denies authorization for the user to access the asset.

Alternatively, in response to receiving the user's request to use the asset, the extended reality server 110A may request a proof of ownership from the client device 130A or the authorization gateway 150. In response, the client device 130A or the authorization gateway 150 extracts the proof of ownership from the user's vault and provides it to the extended reality server 110A. Since the proof of ownership provided is not linked to the user's identity, the extended reality server 110A confirms the user's ownership by sending a request to the identity issuing authority 160. The request may be intermediated by the client device 130A. The client device 130A provides the user's identity, an identity of the user in the session with the extended reality server 110A, and an identifier of the asset. The identity issuing authority 160 verifies that the user owns the asset and generates a token that links the asset to the identity of the user in the session with the extended reality server 110A. The generated token is provided to the extended reality server 110A and, as a result, the extended reality server 110A is now assured that the user requesting access is permitted to access the asset-even if the user's access is anonymous.

The token may identify the asset store from which the access to the asset is received. If the asset store is not the asset store of the extended reality server 110A, an additional transaction may be processed. For example, a user may pay $10 to access an asset in a first extended reality environment. A second extended reality environment may sell the same asset for the same price. However, if the user's ownership of the asset in the first extended reality environment is verified, the second extended reality environment may allow the user to access the asset for a lower fee (e.g., 10%, 20%, 25%, 30%, or 50% of the full price). The fee charged by the second extended reality environment to access an asset that was already purchased from another asset store may be referred to as a tax or a levy. The additional ownership rights may be stored in the user vault.

In response to receiving a response from the authorization gateway 150 that the user should be permitted to access the asset, the extended reality server 110A responds to the user's request to access the asset by providing access to the asset. Had the message from the authorization gateway 150 indicated that the request should be rejected, the extended reality server 110A would reject the user's request to access the asset.

Figure 7:
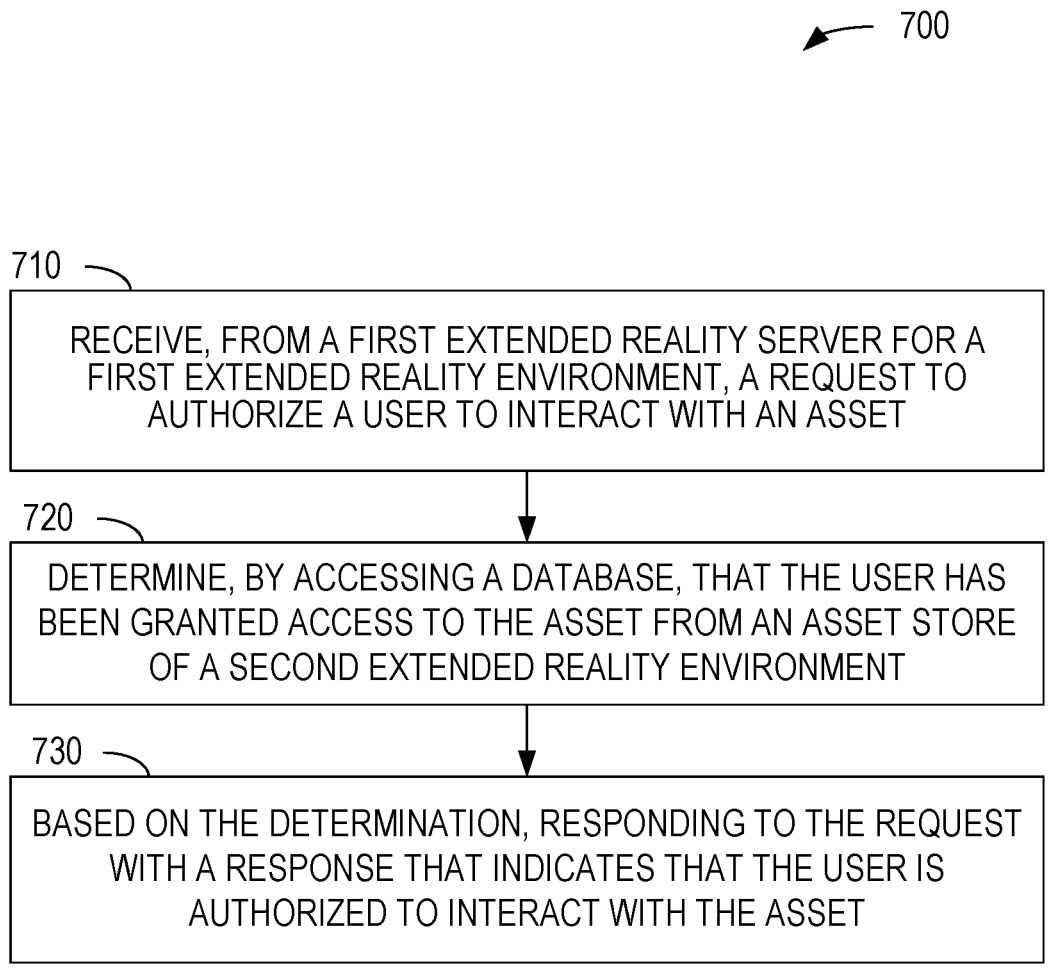
FIG. 7 is a flowchart illustrating operations of a method suitable for implementing user privacy in extended reality, according to some example embodiments.

FIG. 7 is a flowchart illustrating operations of a method suitable for implementing user privacy in extended reality, according to some example embodiments. The method 700 includes operations 710, 720, and 730. By way of example and not limitation, the method 700 is described as being performed by the devices, communications, and data structures of FIGS. 1-6.

In operation 710, the authorization gateway 150 receives, from a first extended reality server (e.g., the extended reality server 110A) for a first extended reality environment (e.g., an extended reality environment provided by a first company), a request to authorize a user to interact with an asset. For example, the user may request to play a song on a jukebox in the first extended reality environment and the first extended reality server will allow this only if the user has received authorization from a rights-holder of the song. In response to receiving the user request, the first extended reality server 110A sends the request to the authorization gateway 150. The request may include an identifier of the user, an identifier of a client device of the user (e.g., the client device 130A), an identifier of the asset, or any suitable combination thereof. The identifier of the user may be an identifier of the user in the first extended reality environment (e.g., a username of the user in the first extended reality environment).

In operation 720, the authorization gateway 150 determines, by accessing a database (e.g., a database provided by the database server 120), that the user has been granted access to the asset from an asset store of a second extended reality environment. For example, the authorization gateway 150 may determine, based on the identifier of the user provided by the first extended reality environment, an identifier of the user used by the database. The conversion may be performed using a lookup table stored by the authorization gateway 150, the lookup table mapping usernames for the same user on different metaverses to each other. The authorization gateway 150 may submit a query to the database that includes the resultant identifier of the user and an identifier of the asset for which access is requested. In response, the database may inform the authorization gateway 150 whether a matching record (indicating that the user has been authorized to access the asset) exists in the database or not. In the example of FIG. 7, the user is authorized to access the asset. The response from the database may indicate the extended reality environment or asset store from which the user purchased the asset. The indicated extended reality environment or asset store may be different from the first extended reality environment.

In operation 730, based on the determination that the user has been granted access to the asset, the authorization gateway 150 sends a response to the first extended reality server that indicates that the user is authorized to interact with the asset.

By contrast with systems in which the first extended reality server determines if the user has purchased access for the asset from an asset store of the first extended reality environment by accessing a database of the first extended reality environment, the method 700 allows the first met extended reality environment averse server to determine if the user has purchased access for the asset from any asset store supported by the authorization gateway 150. As a result, users are enabled to access corresponding assets in many extended reality environments rather than having to purchase access to the asset separately in each extended reality environment.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors configured by the instructions to perform operations comprising: receiving, from a first extended reality server for a first extended reality environment, a request to authorize a user to interact with an asset; determining, by accessing a database, that the user has been granted access to the asset from an asset store of a second extended reality environment; and based on the determination, responding to the request with a response that indicates that the user is authorized to interact with the asset.

In Example 2, the subject matter of Example 1, wherein: the request to authorize the user comprises a first identifier of the user in the first extended reality environment; the operations further comprise based on the first identifier of the user, determining a second identifier of the user; and the determining, by accessing the database, that the user has been granted access to the asset from the asset store of the second extended reality environment comprises forming a query that comprises the second identifier of the user.

In Example 3, the subject matter of Example 2, wherein the operations further comprise: receiving, from the first extended reality server, a request for the second identifier of the user; and based on a stored preference of the user, denying the request for the second identifier of the user.

In Example 4, the subject matter of Examples 2-3, wherein: the second identifier of the user is an identifier of the user in the second extended reality environment.

In Example 5, the subject matter of Example 4, wherein the operations further comprise: receiving, from a server of the asset store of the second extended reality environment, a request for payment for the grant of access to the asset, the request comprising the second identifier of the user in the second extended reality environment; determining, by accessing a second database and based on the second identifier, a third identifier of the user for a financial server; and sending a request to the financial server for a transfer of funds from the user to the asset store of the second extended reality environment, the request comprising the third identifier of the user.

In Example 6, the subject matter of Example 5, wherein the operations further comprise: receiving, from the server of the asset store of the second extended reality environment, a request for the third identifier of the user; and based on a stored preference of the user, denying the request for the third identifier of the user.

In Example 7, the subject matter of Examples 2-6, wherein the operations further comprise: receiving a first request from the user to access the first extended reality environment, the request comprising the second identifier; identifying, based on the second identifier, the first identifier; and sending, on behalf of the user, a second request to the first extended reality server of the first extended reality environment, the second request comprising the first identifier.

Example 8 is a method comprising: receiving, by an authorization gateway and from a first extended reality server for a first extended reality environment, a request to authorize a user to interact with an asset; determining, by accessing a database, that the user has been granted access to the asset by an asset store of a second extended reality environment; and based on the determination, responding, by the authorization gateway, to the request with a response that indicates that the user is authorized to interact with the asset.

In Example 9, the subject matter of Example 8, wherein: the request to authorize the user comprises a first identifier of the user in the first extended reality environment; the method further comprises, based on the first identifier of the user, determining a second identifier of the user; and the determining, by accessing the database, that the user has been granted access to the asset from the asset store of the second extended reality environment comprises forming a query that comprises the second identifier of the user.

In Example 10, the subject matter of Example 9 includes receiving, by the authorization gateway and from the first extended reality server, a request for the second identifier of the user; and based on a stored preference of the user, denying, by the authorization gateway, the request for the second identifier of the user.

In Example 11, the subject matter of Examples 9-10, wherein: the second identifier of the user is an identifier of the user in the second extended reality environment.

In Example 12, the subject matter of Example 11 includes receiving, from a server of the asset store of the second extended reality environment, a request for payment for the grant of access to interact with the asset, the request comprising the second identifier of the user in the second extended reality environment; determining, by accessing a second database and based on the second identifier, a third identifier of the user for a financial server; and sending a request to the financial server for a transfer of funds from the user to the asset store of the second extended reality environment, the request comprising the third identifier of the user.

In Example 13, the subject matter of Example 12 includes receiving, from the server of the asset store of the second extended reality environment, a request for the third identifier of the user; and based on a stored preference of the user, denying the request for the third identifier of the user.

In Example 14, the subject matter of Examples 9-13 includes receiving a first request from the user to access the first extended reality environment, the request comprising the second identifier; identifying, based on the second identifier, the first identifier; and sending, on behalf of the user, a second request to the first extended reality server of the first extended reality environment, the second request comprising the first identifier.

Example 15 is a non-transitory machine-readable medium that stores instructions that, when executed by one or more processors, cause the one or more processors to perform operations comprising: receiving, from a first extended reality server for a first extended reality environment, a request to authorize a user to interact with an asset; determining, by accessing a database, that the user has been granted access to the asset from an asset store of a second extended reality environment; and based on the determination, responding to the request with a response that indicates that the user is authorized to interact with the asset.

In Example 16, the subject matter of Example 15, wherein: the request to authorize the user comprises a first identifier of the user in the first extended reality environment; the operations further comprise, based on the first identifier of the user, determining a second identifier of the user; and the determining, by accessing the database, that the user has been granted access to the asset from the asset store of the second extended reality environment comprises forming a query that comprises the second identifier of the user.

In Example 17, the subject matter of Example 16, wherein the operations further comprise: receiving, from the first extended reality server, a request for the second identifier of the user; and based on a stored preference of the user, denying the request for the second identifier of the user.

In Example 18, the subject matter of Examples 16-17, wherein: the second identifier of the user is an identifier of the user in the second extended reality environment.

In Example 19, the subject matter of Example 18, wherein the operations further comprise: receiving, from a server of the asset store of the second extended reality environment, a request for payment for the grant of access to interact with the asset, the request comprising the second identifier of the user in the second extended reality environment; determining, by accessing a second database and based on the second identifier, a third identifier of the user for a financial server; and sending a request to the financial server for a transfer of funds from the user to the asset store of the second extended reality environment, the request comprising the third identifier of the user.

In Example 20, the subject matter of Example 19, wherein the operations further comprise: receiving, from the server of the asset store of the second extended reality environment, a request for the third identifier of the user; and based on a stored preference of the user, denying the request for the third identifier of the user.

In Example 21, the subject matter of Examples 16-20, wherein the operations further comprise: receiving a first request from the user to access the first extended reality environment, the first request comprising the second identifier; identifying, based on the second identifier, the first identifier; and sending, on behalf of the user, a second request to the first extended reality server of the first extended reality environment, the second request comprising the first identifier.

Example 22 is at least one machine-readable medium including instructions that, when executed by processing circuitry, cause the processing circuitry to perform operations to implement any of Examples 1-21.

Example 23 is an apparatus comprising means to implement any of Examples 1-21.

Example 24 is a system to implement any of Examples 1-21.

Example 25 is a method to implement any of Examples 1-21.

Example Machine Architecture and Machine-Readable Medium

Figure 8:
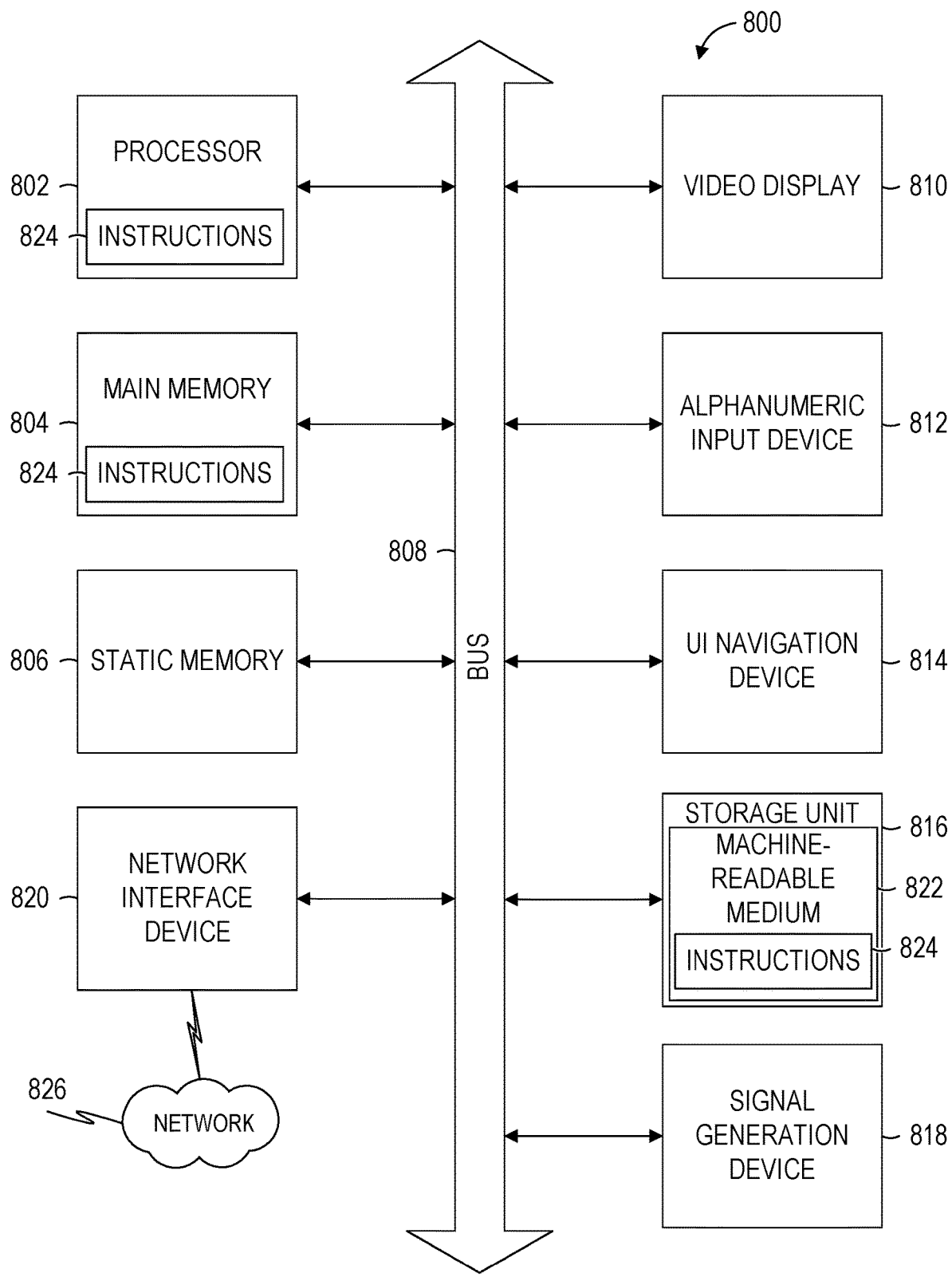
FIG. 8 illustrates a diagrammatic representation of a machine in an example form of a computing device within which a set of instructions may be executed for causing the machine to perform any one or more of the methods discussed herein.

FIG. 8 is a block diagram of a machine in the example form of a computer system 800 within which instructions 824 may be executed for causing the machine to perform any one or more of the methodologies discussed herein, such as those shown in FIG. 6-9. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a storage unit 816, a signal generation device 818 (e.g., a speaker), and a network interface device 820.

Machine-Readable Medium

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 824 may further be transmitted or received over a communications network 826 using a transmission medium. The instructions 824 may be transmitted using the network interface device 820 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
a memory that stores instructions; and
one or more processors configured by the instructions to perform operations comprising:
receiving, from a first extended reality server for a first extended reality environment, a request to authorize a user to interact with an asset, wherein the request to authorize the user comprises a first identifier of the user in the first extended reality environment;
determining a second identifier of the user based on the first identifier of the user;
determining, by accessing a database, that the user has been granted access to the asset from an asset store of a second extended reality environment by forming a query that comprises the second identifier of the user; and
based on the determination, responding to the request with a response that indicates that the user is authorized to interact with the asset.

2. The system of claim 1, wherein the operations further comprise:
receiving, from the first extended reality server, a request for the second identifier of the user; and
based on a stored preference of the user, denying the request for the second identifier of the user.

3. The system of claim 1, wherein:
the second identifier of the user is an identifier of the user in the second extended reality environment.

4. The system of claim 3, wherein the operations further comprise:
receiving, from a server of the asset store of the second extended reality environment, a request for payment for the grant of access to the asset, the request comprising the second identifier of the user in the second extended reality environment;
determining, by accessing a second database and based on the second identifier, a third identifier of the user for a financial server; and
sending a request to the financial server for a transfer of funds from the user to the asset store of the second extended reality environment, the request comprising the third identifier of the user.

5. The system of claim 4, wherein the operations further comprise:
receiving, from the server of the asset store of the second extended reality environment, a request for the third identifier of the user; and
based on a stored preference of the user, denying the request for the third identifier of the user.

6. The system of claim 1, wherein the operations further comprise:
receiving a first request from the user to access the first extended reality environment, the request comprising the second identifier;
identifying, based on the second identifier, the first identifier; and
sending, on behalf of the user, a second request to the first extended reality server of the first extended reality environment, the second request comprising the first identifier.

7. A method comprising:
receiving, by an authorization gateway and from a first extended reality server for a first extended reality environment, a request to authorize a user to interact with an asset, wherein the request to authorize the user comprises a first identifier of the user in the first extended reality environment;
determining a second identifier of the user based on the first identifier of the user;
determining, by accessing a database, that the user has been granted access to the asset by an asset store of a second extended reality environment by forming a query that comprises the second identifier of the user; and
based on the determination, responding, by the authorization gateway, to the request with a response that indicates that the user is authorized to interact with the asset.

8. The method of claim 7, further comprising:
receiving, by the authorization gateway and from the first extended reality server, a request for the second identifier of the user; and
based on a stored preference of the user, denying, by the authorization gateway, the request for the second identifier of the user.

9. The method of claim 7, wherein:
the second identifier of the user is an identifier of the user in the second extended reality environment.

10. The method of claim 9, further comprising:
receiving, from a server of the asset store of the second extended reality environment, a request for payment for the grant of access to interact with the asset, the request comprising the second identifier of the user in the second extended reality environment;

determining, by accessing a second database and based on the second identifier, a third identifier of the user for a financial server; and sending a request to the financial server for a transfer of funds from the user to the asset store of the second extended reality environment, the request comprising the third identifier of the user.

11. The method of claim 10, further comprising:

receiving, from the server of the asset store of the second extended reality environment, a request for the third identifier of the user; and based on a stored preference of the user, denying the request for the third identifier of the user.

12. The method of claim 7, further comprising:

receiving a first request from the user to access the first extended reality environment, the request comprising the second identifier;

identifying, based on the second identifier, the first identifier; and sending, on behalf of the user, a second request to the first extended reality server of the first extended reality environment, the second request comprising the first identifier.

13. A non-transitory machine-readable medium that stores instructions that, when executed by one or more processors, cause the one or more processors to perform operations comprising:

receiving, from a first extended reality server for a first extended reality environment, a request to authorize a user to interact with an asset, wherein the request to authorize the user comprises a first identifier of the user in the first extended reality environment;

determining a second identifier of the user based on the first identifier of the user;

determining, by accessing a database, that the user has been granted access to the asset from an asset store of a second extended reality environment by forming a query that comprises the second identifier of the user; and based on the determination, responding to the request with a response that indicates that the user is authorized to interact with the asset.

14. The non-transitory machine-readable medium of claim 13, wherein the operations further comprise:

receiving, from the first extended reality server, a request for the second identifier of the user; and based on a stored preference of the user, denying the request for the second identifier of the user.

15. The non-transitory machine-readable medium of claim 13, wherein:

the second identifier of the user is an identifier of the user in the second extended reality environment.

16. The non-transitory machine-readable medium of claim 15, wherein the operations further comprise:

receiving, from a server of the asset store of the second extended reality environment, a request for payment for the grant of access to interact with the asset, the request comprising the second identifier of the user in the second extended reality environment;

determining, by accessing a second database and based on the second identifier, a third identifier of the user for a financial server; and sending a request to the financial server for a transfer of funds from the user to the asset store of the second extended reality environment, the request comprising the third identifier of the user.

17. The non-transitory machine-readable medium of claim 16, wherein the operations further comprise:

receiving, from the server of the asset store of the second extended reality environment, a request for the third identifier of the user; and based on a stored preference of the user, denying the request for the third identifier of the user.

18. The non-transitory machine-readable medium of claim 13, wherein the operations further comprise:

receiving a first request from the user to access the first extended reality environment, the first request comprising the second identifier;

identifying, based on the second identifier, the first identifier; and sending, on behalf of the user, a second request to the first extended reality server of the first extended reality environment, the second request comprising the first identifier.

* * * * *